(12) United States Patent
Ishibashi

(10) Patent No.: US 6,605,242 B2
(45) Date of Patent: Aug. 12, 2003

(54) METHOD OF PRODUCING STYRENIC RESIN GRANULATE AND SHAPED ARTICLE

(75) Inventor: Hirofumi Ishibashi, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/984,441

(22) Filed: Oct. 30, 2001

(65) Prior Publication Data

US 2002/0125602 A1 Sep. 12, 2002

(30) Foreign Application Priority Data

Mar. 6, 2001 (JP) ........................................ 2001-061152

(51) Int. Cl.[7] ........................... B29B 9/02; B29B 13/10; B02C 4/00
(52) U.S. Cl. ........................... 264/115; 264/118; 241/3; 241/24.28
(58) Field of Search ................................ 264/115, 118; 241/3, 24.28

(56) References Cited

U.S. PATENT DOCUMENTS

| | | | | |
|---|---|---|---|---|
| 3,903,037 A | * | 9/1975 | Deets | 524/228 |
| 4,054,733 A | * | 10/1977 | Hall et al. | 526/293 |
| 4,178,327 A | * | 12/1979 | Hall et al. | 525/169 |

\* cited by examiner

*Primary Examiner*—Stephen J. Lechert, Jr.
(74) *Attorney, Agent, or Firm*—Oblon, Spivak, McClelland, Maier & Neustadt, P.C.

(57) ABSTRACT

The invention provides a method of producing styrenic resin granulates including dry-compression-molding a powder of styrenic resin having a syndiotactic configuration at a compression pressure of 1–20 t/cm and at a molding temperature falling within the range of the glass transition temperature of the powder of styrenic resin to the melting point thereof, inclusive; and crushing the resultant molded product. High-quality styrenic polymer granulates can be produced in an industrially advantageous manner by means of a large-scale apparatus for producing styrenic polymer having a syndiotactic configuration.

5 Claims, No Drawings

METHOD OF PRODUCING STYRENIC RESIN GRANULATE AND SHAPED ARTICLE

FIELD OF THE INVENTION

The present invention relates to a method of producing styrenic resin granulates from styrenic resin powder, and to a shaped article produced by molding the granulates. More particularly, the invention relates to a method of producing styrenic resin granulates, with good manageability and extrudability, in a large-scale apparatus, the granulates having excellent hue and a small amount of residual organic solvent, as well as to a shaped article produced by completely melting the granulates and molding the resultant melt.

BACKGROUND ART

Styrenic polymers having a highly syndiotactic configuration (hereinafter may be abbreviated as SPS), which have been developed in recent years, have already found utility in a broad range of engineering plastics having excellent properties such as resistance to heat and chemicals.

Among methods of producing SPS, Japanese Patent Application Laid-Open (kokai) No. 187708/1987 discloses a method in which styrenic monomers are polymerized, in inert hydrocarbon solvent or in the absence of solvent, in the presence of a catalyst comprising a titanium compound and a condensation product of water and a trialkylaluminum.

In general, conventional SPS production processes employ small-scale apparatus and involve polymerization in a polymerizer; removal of volatile components and deactivation in an extruder; and pelletizing. Through such a very simple process, conventional styrenic resin granulates have been produced.

When the aforementioned SPS production process is carried out by use of a large-scale apparatus, the following problems arise in a granulation stage.

(1) High costs of a specially designed extruder and installation thereof.
(2) Requirements for use of a large motor and installation of a high-temperature heating medium for heating a jacket, thereby elevating variable costs.
(3) Cumbersome operation due to requirement for a crystallization apparatus after granulation.
(4) Increase in number of heat hysteresis cycles by melting resin during granulation, thereby readily deteriorating quality of products.

Thus, an object of the present invention is to provide, through solving the aforementioned problems arising during granulation when the scale of the SPS production process is elevated, a method of producing high-quality styrenic resin granulates in an industrially advantageous manner.

SUMMARY OF THE INVENTION

In view of the foregoing, the present inventor has conducted earnest studies on scale-up of the granulation system in the SPS production process, and has found that when a styrenic polymer (SPS) which has been removed from a polymerizer and from which volatile components are removed is subjected to a specific format of dry compression molding, SPS granulates(pellets) endowed with quality and manageability compared to those of conventional SPS granulates can be produced by means of a large-scale apparatus and in an industrially advantageous manner. The present invention has been accomplished on the basis of this finding.

Accordingly, the summary of the present invention is as follows:

[1] a method of producing styrenic resin granulates, comprising dry-compression-molding a powder of styrenic resin having a highly syndiotactic configuration at a compression pressure of 1–20 t/cm and at a molding temperature falling within a range of the glass transition temperature of the powder of styrenic resin to the melting point thereof, inclusive; and crushing the resultant molded product.

[2] a method of producing styrenic resin granulates according to above mentioned [1], wherein the produced styrenic resin granulates contain an organic solvent in an amount of 1 wt. % or less.

[3] a method of producing styrenic resin granulates according to above mentioned [1] or [2], wherein the powder of styrenic resin to be dry-compression-molded is obtained by continuously feeding styrenic resin powder containing an organic solvent to a vessel which contains styrenic resin powder and evaporating the solvent.

[4] a method of producing styrenic resin granulates according to any one of above mentioned [1] to [3], further comprising classifying particles obtained by crushing the molded product by means of a disintegrator by use of two-stage vibratory screens; disintegrating particles remaining on an upper screen by means of another disintegrator; and feeding, together with particles which have passed through a lower screen, the resultant disintegrated matter back to the upstream step performed in a dry compression molding apparatus, to thereby mix into styrenic resin powder serving as a raw material.

[5] a styrenic resin shaped article which is produced by completely melting and molding the styrenic resin granulates obtained through a method as recited in any one of above mentioned [1] to [4].

DETAILED DESCRIPTION OF PREFERRED EMBODIMENTS

The present invention will next be described in more detail.

1. Styrenic Polymer Useful in the Present Invention

The styrenic polymer which is useful in the present invention has a highly syndiotactic configuration. The SPS powder removed from a polymerization tank contains residual volatile components such as unreacted monomers.

The term "syndiotactic configuration" refers to the stereochemical structure having a syndiotactic configuration; i.e., a steric structure in which side-chain phenyl groups and substituted phenyl groups are located alternately in opposite directions on a main chain comprising carbon-carbon bonds. The tacticity thereof is determined through the nuclear magnetic resonance method making use of an isotopic carbon ($^{13}$C-NMR method).

The tacticity determined through the $^{13}$C-NMR method can be represented by the number of existing plural continuous constitutional units. For example, in the case in which two continuous units exist, the tacticity is called a diad; in the case in which three continuous units exist, it is called a triad; and in the case in which five continuous units exist, it is called a pentad. The styrenic polymer having a syndiotactic configuration according to the present invention refers to polystyrene, poly(alkylstyrene), poly(halogenated styrene), poly(halogenated alkylstyrene), poly (alkoxystyrene), poly(vinyl benzoate), a halogenated polymer thereof, a mixture thereof, or a copolymer predominantly containing any of the above polymers, the syndiotacticity typically being 75% or more, preferably 85% or more in terms of a racemic diad, or typically 30% or more, preferably 50% or more, in terms of a racemic pentad.

Examples of the poly(alkylstyrene) include poly(methylstyrene), poly(ethylstyrene), poly(isoproylstyrene), poly(tert-butylstyrene), poly(phenylstyrene), poly(vinylnaphthalene), and poly(vinylstyrene). Examples of the poly(halogenated styrene) include poly(chlorostyrene), poly(bromostyrene), and poly(fluorostyrene). Examples of the poly(halogenated alkylstyrene) include poly(chloromethylstyrene). Examples of the poly(alkoxystyrene) include poly(methoxystyrene) and poly(ethoxystyrene).

Of these, examples of particularly preferred styrenic polymers include polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene, and a copolymer containing a moiety of any of these polymers as a structural unit.

Specific examples of preferred copolymers include styrene-p-methylstyrene copolymers containing p-methylstyrene repeating units in amounts of 3 mol % or more. No particular limitation is imposed on the molecular weight of the styrenic polymers, and the weight-average molecular weight thereof is preferably 10,000 or more, more preferably 50,000 or more. In addition, the molecular weight distribution profile is not particularly limited, and styrenic polymers having a wide variety of molecular weight distribution profiles may be employed. When the weight-average molecular weight is less than 10,000, thermal properties and mechanical properties of the compositions and shaped articles obtained from the polymers are disadvantageously deteriorated.

No particular limitation is imposed on the method of producing SPS. For example, as mentioned above, SPS can be produced by polymerizing styrenic monomers (monomers corresponding to the aforementioned styrenic polymers), in inert hydrocarbon solvent or in the absence of solvent, and in the presence of a catalyst comprising a titanium compound and a condensation product of water and a trialkylaluminum (Japanese Patent Application Laid-Open (kokai) No. 187708/1987). Poly(halogenated alkylstyrene) can be produced through the method disclosed in Japanese Patent Application Laid-Open (kokai) No. 46912/1989, and the aforementioned hydrogenated polymer can be produced through a known method; e.g., the method disclosed in Japanese Patent Application Laid-Open (kokai) No. 178505/1989. The SPS powder, produced through any of these methods and removed from a polymerization tank, generally contains residual volatile components such as unreacted monomers in a total amount of 2–80 wt. %.

2. Method of Removing Residual Volatile Components

In the present invention, preferred styrenic resin powder to be compression-molded is obtained by continuously feeding styrenic resin powder containing an organic solvent to a vessel which contains SPS powder (styrenic resin powder) that has been removed from a polymerization tank prior to dry compression molding, and evaporating the solvent.

More preferably, a mixture of SPS powder (styrenic resin powder) and steam is placed in the aforementioned vessel, and styrenic resin powder containing an organic solvent is continuously fed into the vessel. In addition, the mixture of SPS powder and steam preferably remains stirred.

The residual volatile components are removed from the SPS powder in a drying apparatus. The following drying conditions are employed.

Drying Pressure

Although no particular limitation is imposed on the interior pressure of the drying apparatus, slightly pressurized conditions; i.e., 1.02–1.05 bar, are preferred. This is because excessively elevated pressure lowers drying efficiency and pressure that is reduced excessively may impose overload on a blower. Drying under reduced pressure is also applicable. However, oxygen contained in any air which may intrude into the drying apparatus may deteriorate styrenic polymer through oxidation, causing problems such as yellowing. Thus, treatment such as addition in advance of an appropriate anti-oxidant to styrenic polymer to be dried enables drying under reduced pressure.

Drying Temperature and Liquid Content

Prior to dry compression molding, the styrenic polymer is dried to a liquid content [(total weight of volatile components contained in powder)×100/(total weight of powder containing volatile components)] of 10 wt. % or less, preferably 5 wt. % or less. In the case of polystyrene (homo-powder), the drying temperature is 250° C. or lower, preferably 180–240° C., more preferably 200–230° C.

In the case in which a styrene-p-methylstyrene copolymer containing p-methylstyrene repeating units in amounts of 3 mol % is employed as styrenic polymer, the drying temperature is 210° C. or lower, preferably 100–200° C., more preferably 120–190° C.

The present invention is directed to a method of producing styrenic resin granulates from a powder of styrenic resin having a highly syndiotactic structure, and no particular limitation is imposed on the type of styrene resin constituting the powder. The production method will next be described in more detail while taking polystyrene (homo-powder) as an example.

The drying temperature for adjusting the liquid content to 10 wt. % or less will be described. At an initial stage of drying, large amounts of styrene monomers still remain. In this case, when drying is performed at higher than 250° C., a portion of styrenic polymer subjected to drying readily melts, to thereby cause adhesion of molten polymer to the inner wall of a drying apparatus, causing problems such as failure of the drying apparatus or considerable reduction in drying efficiency. Particularly, when the styrenic polymer is styrene-p-methylstyrene copolymer having a comparatively low melting point, this phenomenon occurs with high probability.

A low drying temperature is slightly preferred from the viewpoint of prevention of adhesion of powder, caused by melting of styrenic polymer, onto the inner wall of a drying apparatus. Even though adhesion of powder onto the inner wall of a drying apparatus can be prevented by drying at low temperature, drying at low temperature prolongs drying time and requires an increase in the scale of the drying apparatus, posing problems.

In order to solve the aforementioned problems, drying may be performed by a plurality of divided steps. Specifically, as a first step, drying is performed until the liquid content reaches 10 wt. % or less, at 250° C. or lower, preferably 180–240° C., more preferably 200–230° C. In any subsequent step, the drying temperature is controlled to a temperature not higher than the melting point of the styrenic polymer constituting the powder. So long as the drying temperature does not exceed the melting point of the styrenic polymer, the temperature is preferably as high as possible in order to enhance drying efficiency. The drying process can be completed more efficiently under such temperature conditions.

Alternatively, the temperature may be modified continuously and not in the aforementioned divided step manner.

Specifically, drying is performed initially until the liquid content reaches 10 wt. % or less, at 250° C. or lower, preferably 180–240° C., more preferably 200–230° C., and subsequently, at an arbitrary time, the temperature is lowered to a temperature not higher than the melting point of the styrenic polymer.

When the liquid content is higher than 10 wt. %, large amounts of styrene monomers remain. In this case, a portion of styrenic polymer subjected to drying readily melts, and adhesion of polymer onto the inner wall of a drying apparatus readily occurs. No particular limitation is imposed on the number and model of the drying apparatus to be employed, so long as the apparatus allows the treatment under the aforementioned drying temperature conditions. Specifically, a plurality of drying apparatuses may be employed, and no particular limitation is imposed on the type of the drying apparatus, so long as the drying temperature can be adjusted. Drying apparatuses such as a jacketed trough dryer, a jacketed paddle dryer, and a fluidized bed dryer may be used.

In another preferred mode for drying the contents, only one drying apparatus in which a jacket is divided into a plurality of portions is employed and the inside temperature of an intake portion is controlled to 250° C. or lower, whereas that of an exhaust portion is controlled to the melting point of the styrene resin.

3. Method of Dry Compression Molding

In the present invention, the SPS powder from which residual volatile components have been removed in the aforementioned manner is subjected to dry compression molding. The SPS powder to be dry-compression-molded typically has an average particle size of 0.1–7 mm, preferably 0.15–5 mm, more preferably 0.2–3 mm. When the average particle size is smaller than 0.1 mm, management of powder becomes difficult because of increased adhesion, lowered fluidity, etc., whereas when the size is in excess of 7 mm, there arises a failure to attain effective compression by a dry compression molding apparatus, leading, in some cases, to a decrease in strength of granulates obtained by crushing the molded powder.

The temperature of the SPS powder to be subjected to dry compression molding is preferably 120–220° C. When the temperature of the SPS powder to be subjected to dry compression molding is too low, the granulates obtained from the molded powder are of lowered strength, readily being pulverized in subsequent handling steps. In addition, dust generation during a secondary processing may inhibit continuous operation. In contrast, when the temperature of the SPS powder to be subjected to dry compression molding is excessively high, the powder melts during compression with a dry compression molding apparatus and adheres to a roll, posing difficulty in continuous operation.

The residual monomer content of the SPS powder to be subjected to dry compression molding is preferably 1 wt. % or less. When the content is higher than 1 wt. %, management of the powder is difficult, and granulates obtained from the powder tend to contain large amounts of residual monomers, thereby necessitating a further drying step.

Examples of the dry compression molding apparatus to be used in the present invention include a bricketting machine, a compacting machine, a gear-type extrusion-granulator, a ring-die extrusion-granulator, a tableting machine, and a roll press. Of these, a bricketting machine and a compacting machine are preferably employed. In addition, a dry compression molding apparatuses having an inter-roll clearance of 0.01–5 mm and a roll width of 35 mm or more is preferred.

The compression pressure of the SPS powder introduced in a dry compression molding apparatus must be controlled to 1–20 t/cm, compression pressure being defined as follows:

Compression pressure($t/cm$)=(pressure applied to the entirety of roll)/(roll width).

When the compression pressure is lower than 1 t/cm, the strength of granulates yielded from molded products obtained by means of a dry compression molding apparatus decreases, whereas when the compression pressure is higher than 20 t/cm, the powder adheres to a roll or a similar part, leading to difficulty in continuous operation, which is economically disadvantageous.

The molding temperature of a dry compression molding apparatus falls within the range of the glass transition temperature of styrenic resin powder to the melting point thereof, inclusive. The temperature is preferably 120–220° C. The temperature is defined as the temperature of the styrenic resin powder before processing in the dry compression molding apparatus.

When the molding temperature is below the lower limit of the range, the granulates obtained from the molded powder are of poor strength, readily being pulverized in subsequent handling steps. Furthermore, dust generation during a secondary processing may inhibit continuous operation. When the molding temperature is above the upper limit of the range, the resultant molded product exhibits high strength, leading to difficulty in crushing the product.

The molded product obtained by means of the aforementioned dry compression molding apparatus is crushed by means of a disintegrator or a similar apparatus. In general, the crushed product is pelletized, and the resultant granulates are used for molding. When a compacting machine is employed, a disintegrator equipped with edges, such as a rotatable cutter, is employed.

The particle size of crushed particles for producing granulates is approximately 0.5–5 mm, depending on the use thereof. The crushed particles are classified by use of a vibratory screen. The crushed particles are classified by use of two-stage vibratory screens, and particles having a particle size greater than the desired particle size remaining on an upper screen during classification are disintegrated and fed back to the upstream step performed in the molding apparatus. Smaller particles which have been passed through a lower screen are fed back to the upstream step performed in the dry compression molding apparatus; e.g., a drying step. Thus, loss of crushed particles can be prevented, to thereby produce target styrenic resin granulates in an economically advantageous manner.

4. Styrenic Resin Granulates (Pellets) and Shaped Articles

The styrenic resin granulates(pellets) yielded in the aforementioned manner are completely melted and subjected to a variety of molding processes, to thereby yield final shaped articles. Upon molding, additives such as an anti-oxidant, a flame retardant, a flame retardant aid, a nucleating agent, and a stabilizer are supplied before processing in a dry compression molding apparatus. Alternatively, these additives may be added to the styrenic resin granulates of the present invention during production of a master batch to be subjected to a variety of molding processes.

The organic solvent content of the styrenic resin granulates (pellets) produced in accordance with the present invention is preferably 2,000 ppm or less, more preferably 1,000 ppm or less. An organic solvent content in excess of 2,000 ppm deteriorates quality of shaped articles and readily causes problems of hue or other properties.

In terms of properties of the styrenic resin granulates (pellets) of the present invention, the size thereof, which varies in accordance with the apparatus of subsequent steps, such as extruders and injection-molding apparatuses, may be approximately equal to that of products obtained by extrusion-melting of commercial resin powder and pelletizing. The crystallinity is preferably 5% or more, more preferably 15% or more, particularly preferably 20% or more. The bulk density is preferably approximately 0.2–0.7.

EXAMPLES

The present invention will next be described in more detail by way of examples, which should not be construed as limiting the invention thereto.

Production Example 1

Production of Styrenic Polymer Having a Syndiotactic Configuration

Crushed SPS powder (60 kg) was introduced into a cleaned complete-mixing-tank polymerizer equipped with helical paddles (inside diameter: 550 mm, height: 800 mm, internal volume: 200 L), and the powder was continuously impelled at 50 rpm, followed by drying at 90° C. for two hours under nitrogen flow. After adjustment of the internal temperature of the polymerizer to 75° C., a styrene monomer and a catalyst were fed into the polymerizer.

The employed feed rates of the styrene monomer and the catalyst were as follows:

(1) Styrene monomer: 8 L/h
(2) Catalyst:
   (A) (Pentamethylcyclopentadienyl)trimethoxytitanium:
      1 mmol/h
   (B) Methylaluminoxane:
      75 mmol/h (as reduced to Al concentration)
   (C) Triisobutylaluminum:
      25 mmol/hps The aforementioned catalyst components (A) to (C) were separately fed at the above rate without pre-mixing, and intermingled in a catalyst-feed line located just before the polymerizer. The intermingled catalyst was continuously fed from the nozzle provided in a side wall of the polymerizer to the powder bed.

The styrene monomer was continuously added dropwise from the nozzle provided in the top plate of the polymerizer to the space above the powder bed.

The formed polymer powder was continuously removed from the bottom portion while the level (the volume of the contents) of the polymerizer was maintained. The weight average molecular weight of the polymer was found to be 220,000, as measured through gel permeation chromatography at 130° C. by use of 1,2,4-trichlorobenzene as a solvent. The ratio of the weight-average molecular weight to the number-average molecular weight was found to be 2.0. Through measurement of melting point and $^{13}$C-NMR, the polymer was identified as SPS. The liquid content (total weight of volatile components contained in powder×100/total weight of powder containing volatile components) of the styrene polymer was found to be 20 wt. %.

Production Example 2

Production of SPS Powder

By use of Torus Disk TDS26-5 (volume: 0.28 m$^3$) (product of Hosokawa Micron), the styrene polymer produced in the aforementioned Production Example 1 (10 kg/h) was dried at 1.03 bar and 165° C. in the presence of steam (10 kg/h).

After completion of drying, no polymer adhesion on the inside the wall of the drying apparatus was observed. The produced polymer powder was found to have a liquid content of 0.1 wt. %, a glass transition temperature of 100° C., and a melting point of 270° C.

Example 1

The SPS powder produced in Production Example 2 was fed into a dry compression molding apparatus at a feed temperature of 180° C. The SPS powder had an average particle size of 0.6 mm. The employed molding apparatus was CS-25 (roll diameter: 258 mm, roll width: 38 mm) (product of Hosokawa Micron), and the compression pressure during compression molding was 4.3 t/cm.

The resultant molded sheet was crushed by means of a disintegrator (Rotoflex R20/10, cutter diameter: 200 mm screen 8 mm, product of Hosokawa Micron), and the crushed matter was classified by use of vibratory screens (product of Tokujyu, upper screen: 5 mm, lower screen: 2 mm), to thereby yield 120 kg of granulates having a crystallinity of 60%.

The thus-yielded granulates were processed into a compound. During production of the compound, smooth operation of process apparatuses was attained, and good productivity and manageability of granulates were also attained. Thus, the process yielded 250 kg of the compound, which exhibited quality similar to that of a compound produced from granulates obtained by means of a conventional extruder.

Example 2

The granulation of Example 1 was repeated, except that the temperature of SPS powder introduced into a dry compression molding apparatus was controlled to 155° C., to thereby yield granulates. In a manner similar to that of Example 1, the granulates were processed into a compound. During production of the compound, smooth operation of process apparatuses was attained, and the obtained compound had a quality similar to that of a compound obtained from conventional granulates.

Comparative Example 1

The granulation of Example 1 was repeated, except that the compression pressure during dry compression molding was controlled to 0.6 t/cm, to thereby yield 105 kg of granulates. Operation of the dry compression molding apparatus was smooth.

During processing of the yielded granulates into a compound, pulverization occurred in a mixer for mixing granulates and additives, thereby disturbing constant feed of raw material from a belt-weighing feeder provided on the downstream side to a kneader. Thus, hunting of torque of the kneader occurred, thereby failing to attain continuous operation.

Comparative Example 2

The granulation of Example 1 was repeated, except that the temperature of SPS powder introduced into a dry compression molding apparatus was controlled to 80° C. (not higher than the glass transition temperature), to thereby yield granulates.

During processing of the yielded granulates into a compound, pulverization occurred in a mixer for mixing granulates and additives, thereby disturbing constant feed of raw material from a belt-weighing feeder provided on the downstream side to a kneader. Thus, hunting of torque of the kneader occurred, thereby failing to attain continuous operation.

As is clear from the aforementioned Examples, according to the present invention, there can be constantly produced a compound exhibiting quality similar to that of a compound produced from granulates obtained by means of a conventional extruder.

The method of the present invention provides the following advantages.

(1) A dry compression molding apparatus is used instead of an extruder, thereby reducing apparatus costs and plant construction costs.

(2) Decrease in electric power consumption and employment of a simpler heating medium reduce variable costs.

(3) Melting of resin during granulation is omitted, thereby obviating a crystallization apparatus, and the quality of products is maintained by virtue of a decrease in the number of heat hysteresis cycles.

(4) The granulates produced in accordance with the present invention are endowed with manageability in a secondary processing and shaped-article-productivity similar to those of conventional granulates, thereby providing shaped articles exhibiting quality similar to that of conventional shaped articles.

What is claimed is:

1. A method of producing styrenic resin granulates, comprising dry-compression-molding a powder of styrenic resin having a highly syndiotactic configuration at a compression pressure of 1–20 t/cm and at a molding temperature falling within a range of the glass transition temperature of the powder of styrenic resin to the melting point thereof, inclusive; and crushing the resultant molded product.

2. A method of producing styrenic resin granulates according to claim 1, wherein the produced styrenic resin granulates contain an organic solvent in an amount of 1 wt. % or less.

3. A method of producing styrenic resin granulates according to claim 1, wherein the powder of styrenic resin to be dry-compression-molded is obtained by continuously feeding styrenic resin powder containing an organic solvent to a vessel which contains styrenic resin powder and evaporating the solvent.

4. A method of producing styrenic resin granulates according to claim 1, further comprising classifying particles obtained by crushing the molded product by means of a disintegrator by use of two-stage vibratory screens;

disintegrating particles remaining on an upper screen by means of another disintegrator; and feeding, together with particles which have passed through a lower screen, the resultant disintegrated matter back to the upstream step performed in a dry compression molding apparatus, to thereby mix into styrenic resin powder serving as a raw material.

5. A styrenic resin shaped article which is produced by completely melting and molding the styrenic resin granulates produced by the method according to claim 1.

* * * * *